United States Patent [19]

Watabe et al.

[11] Patent Number: 4,621,224
[45] Date of Patent: Nov. 4, 1986

[54] POSITION/SPEED DETECTION METHOD AND APPARATUS

[75] Inventors: Mitsuru Watabe; Shigeki Morinaga, both of Hitachi; Yasuyuki Sugiura, Takahagi; Tadashi Takahashi, Hitachi, all of Japan

[73] Assignee: Hitachi, Ltd., Tokyo, Japan

[21] Appl. No.: 721,959

[22] Filed: Apr. 11, 1985

[30] Foreign Application Priority Data

Apr. 12, 1984 [JP] Japan ................................... 59-71865

[51] Int. Cl.[4] ............................................. G05B 11/18
[52] U.S. Cl. .................................. 318/594; 318/602; 318/608; 318/636; 364/182
[58] Field of Search ............... 318/594, 636, 603, 608, 318/602; 364/182

[56] References Cited

U.S. PATENT DOCUMENTS

| | | | |
|---|---|---|---|
| 3,670,228 | 6/1972 | Crosby | 318/594 |
| 4,315,198 | 2/1982 | Lin et al. | 318/594 |
| 4,429,267 | 1/1984 | Veale | 318/594 |
| 4,529,325 | 7/1985 | Moon | 318/594 |

Primary Examiner—B. Dobeck
Attorney, Agent, or Firm—Antonelli, Terry & Wands

[57] ABSTRACT

A position/speed detection method and apparatus employing an encoder mounted on the rotary shaft of a motor in order to control the position and speed, wherein the coarse position and fine position are simultaneously detected by an encoder pulse and an encoder original signal, respectively and the detected results are combined to detect the position and speed of the motor with high precision.

9 Claims, 8 Drawing Figures

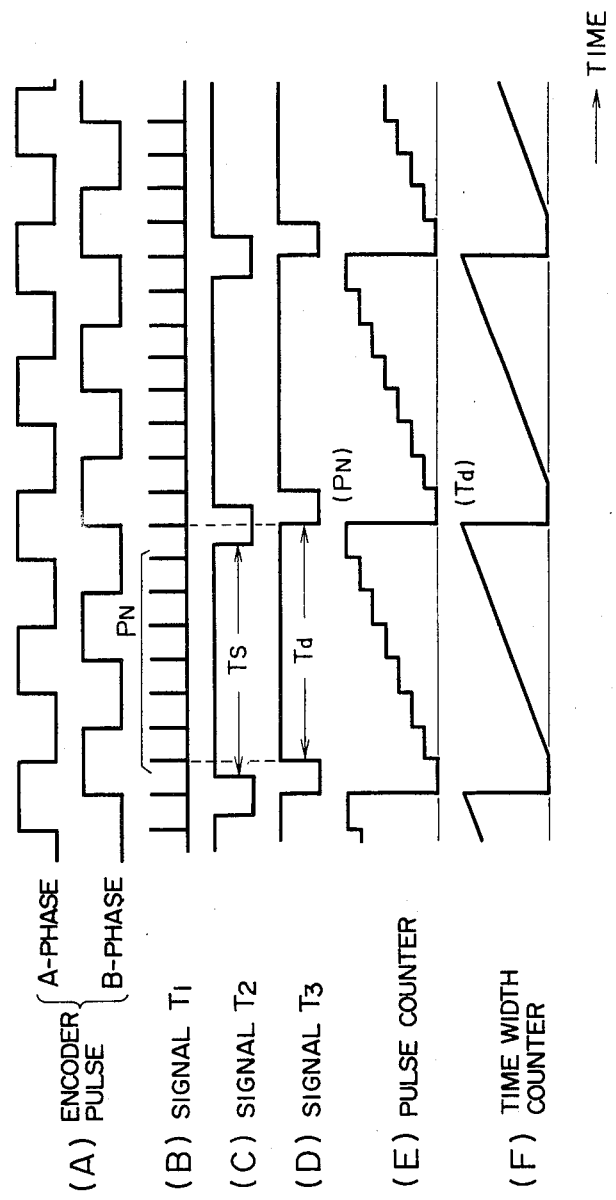

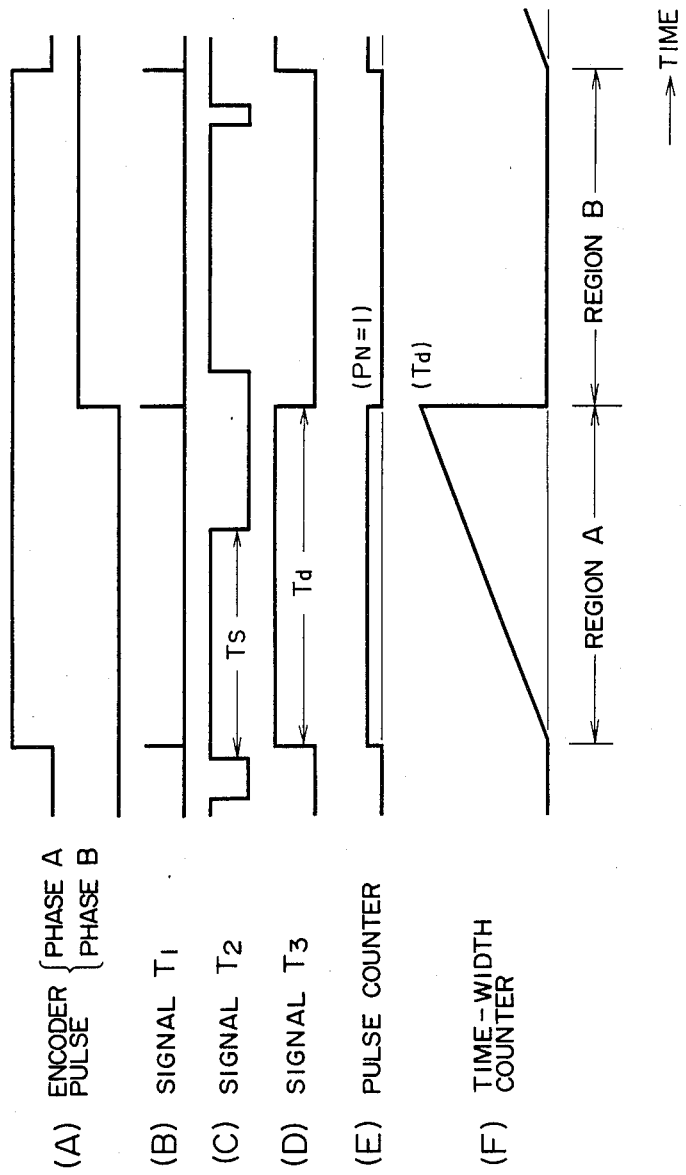

POSITION/SPEED DETECTION METHOD AND APPARATUS

BACKGROUND OF THE INVENTION

This invention relates to position/speed detection method and apparatus in which a stable sampling time can be achieved, the sampled and held two-phase waves of an encoder original signal are pulse-width modulated, and the amplitude fluctuation of the encoder original signal is corrected by the pulse width of the two-phase waves. Particularly, this invention relates to a position/speed detection method and apparatus suitable for detecting the rotational position and speed with high precision irrespective of the amplitude fluctuation of the encoder original signal.

This position/speed detection method and apparatus are used with drive motors and various different servo motors for NC (numeral control) apparatus, robots and so on.

This invention is suitable for digital control using a microcomputer.

There is a known speed detection method using an encoder pulse as shown in FIG. 6. FIG. 7 shows a timing chart for the speed detection.

This is, a microcomputer in an arithmetic control unit is formed of a CPU 101, a ROM 102 and a RAM 103, and performs control and arithmetic operations for speed detection.

The speed, $V_F$ is determined by the ratio of the number, $P_N$ of encoder pulses within a constant time to the time, Td, based on the following equation:

$$V_F = K_1 \cdot P_N / Td \tag{1}$$

where $K_1$ is a constant dependent on the number of encoder pulses per revolution.

The encoder is generally mounted on the shaft of a moving body or rotating body, for example, a servo motor. The output signal from the encoder, or encoder pulse is formed of two-phase signals of phases A and B displaced 90° from each other as shown in FIG. 7A.

An encoder pulse shaping circuit 108 shown in FIG. 6 detects the leading and trailing edges of the two-phase pulse signals and generates a $T_1$ signal (having ¼ the period of the encoder pulse) as shown in FIG. 7B.

A sampling timer 104 shown in FIG. 6 is connected to a data bus 111 of the microcomputer and produces a $T_2$ signal with a sampling time Ts for the speed detection as shown in FIG. 7C.

A pulse counter 105 in FIG. 6 is connected to the data bus 111 of the microcomputer and counts the number (data $P_N$ of encoder pulses within the sampling time Ts. The data (FIG. 7E) from the counter 105 is supplied through the data bus 111 to the microcomputer.

A synchronizing circuit 107 in FIG. 6 latches the $T_2$ signal for sampling in response to the $T_1$ signal and produces a $T_3$ signal as shown in FIG. 7D.

A time-width counter 106 as a time width timer in FIG. 6 is connected to the data bus 111 of the microcomputer as the sampling timer 104 and pulse counter 105 are connected and counts the time width of the $T_3$ signal from the synchronizing circuit 107. The counted data (FIG. 7F) of time interval Td is supplied throught the data bus 111 to the microcomputer.

In FIG. 6, 110 represents an address bus, 112 a reference clock signal line and 113 an interrupt signal line.

Thus, the data of the number $P_N$ (FIG. 7E) of encoder pulses and data (FIG. 7F) of the time interval Td are arithmetically processed in accordance with Equation (1) by the microcomputer, so as to produce the speed Vp.

This previously proposed speed detection method is able to detect the speed with high precision when the motor is rotated at a high speed.

In this method, however, when the motor speed is reduced, it cannot be detected at each sampling time.

FIG. 8 shows a timing chart for low speed.

When the motor is rotated at a low speed, the sampling time Ts (FIG. 8C) may not be synchronized with the encoder pulse (FIG. 8A) (region B), or may be synchronized therewith but in this case the time interval Td (FIG. 8D) becomes very long (region A).

In those cases, since the sampling time Ts is regarded as being equivalently extended, the control system has a poor response.

Moreover, when the motor is still in its rotation, the above method of detecting the speed cannot be detected. This disadvantage should be obviated.

SUMMARY OF THE INVENTION

It is an object of this invention to provide a position/speed detection method and apparatus capable of precisely detecting the position and speed of a movable body by obviating the conventional drawbacks mentioned above, that is, by preventing the response of the control system from being reduced by the speed dependency of the time interval equivalent to the sampling time, to thereby have a stable sampling time, and by preventing the position and speed detection from being affected by the amplitude fluctuation of the original signal from the encoder, the change of ambient temperature and the low-speed rotation (or movement) of the movable body to be detected.

According to this invention, there is provided a position/speed detection method and apparatus using an encoder connected to a moving body wherein coarse detection of position by an encoder pulse and fine detection of position by an original signal from the encoder are performed at the same time to thereby detect the position and the speed on the basis of the amount of change of the detected position.

BRIEF DESCRIPTION OF THE DRAWINGS

FIGS. 7A, 7B, 7C, 7D, 7E, 7F are a timing chart for the speed detection in the conventional apparatus.

FIGS. 8A, 8B, 8C, 8D, 8E, 8F are a timing chart for the low-speed detection in the conventional apparatus.

DESCRIPTION OF THE PREFERRED EMBODIMENTS

An embodiment of this invention will be described with reference to FIGS. 1 to 5.

First, the principle of this invention will be mentioned below.

The position/speed detection apparatus of this invention employs an encoder connected to a moving body, and is formed of a coarse position detecting section including a waveform shaping circuit which is responsive to an original signal from the encoder to produce an encoder pulse, an up/down counter for detecting a coarse position by counting the encoder pulse and an temporary storage circuit for temporarily storing the detected coarse position in order to synchronize with a sampling time from a sampling pulse timer which generates a sampling signal at each sampling time, and a fine position detecting section including a sample holder for holding the encoder original signal for the sampling time, a saw-tooth wave generating circuit which is actuated by the sampling signal from the sampling pulse timer to produce a carrier wave on which the encoder original signal is pulse-width modulated, a pulse-width modulating circuit for modulating the encoder original signal, and a time-width counter for counting the pulse width, the sampling pulse timer, the temporary storage circuit and the time-width counter being connected to an arithmetic control section.

The principle under which the position and speed are detected will be described below.

Generally, the encoder has an original signal which changes as a sine wave, and this encoder original signal is shaped in its waveform to produce an encoder pulse.

This invention employs the sine wave-shaped encoder original signal in order to detect the position and speed.

A two-phase encoder original signal has an A-phase signal voltage $e_A$ and a B-phase signal voltage $e_B$ (see FIG. 2A) as expressed by $$e_A = E \sin(K_E \theta_E) \qquad (2)$$

$$e_B = -E \cos(K_E \theta_E) \qquad (3)$$

where E is the amplitude of the encoder original signal, $K_E$ is a constant depending on the number of the cycles of the encoder original signal per revolution of the encoder and $\theta_E$ is the position of the encoder.

In order to correct for the fluctuation of the amplitude E and precisely detect the position from Equations (2) and (3), the amplitude E is eliminated from Equations (2) and (3) or Equations (2) and (3) are solved for the amplitude E.

The elimination of the amplitude E is effected by the division between Equations (2) and (3).

As a result of the division, the position is expressed by the following equation:

$$\phi = \tan^{-1}(-e_A/e_B),$$

$$\theta'_E = \phi/K_E \qquad (4)$$

where $\phi$ is the fine position determined when the period of the encoder original signal is $2\phi$ and $\theta'_E$ is the fine position converted to the encoder position.

Since Equation (4) is the reciprocal of a periodical function, the position expressed by Equation (4) has an infinite number of periods.

Figure 5:
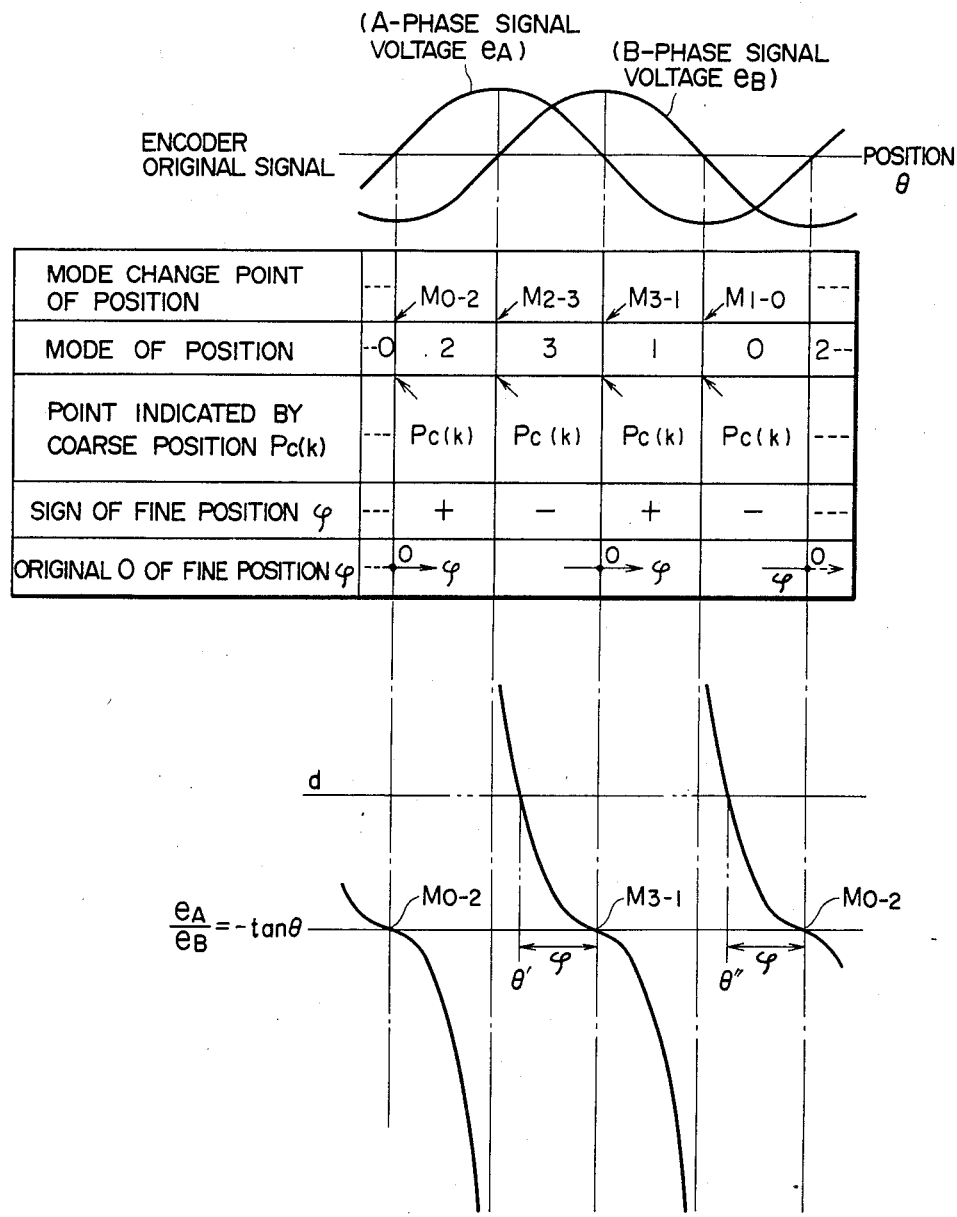
FIG. 5 is an explanatory diagram for explaining the principle of the detection of position.

For example, in FIG. 5 for explaining the principle of the position detection, when the A-phase signal voltage $e_A$ = B-phase signal voltage $e_B$ = d, the position $\theta$ includes a great number of points $\theta'$, $\theta''$, ...

Therefore, in addition to use of Equation (4), coarse position is simultaneously detected by using the encoder pulse having ½ or ¼ the period of the encoder original signal. By the combination of these results, it is possible to precisely detect the position in a wide range.

On the other hand, the determination of the amplitude E is made by adding the square of Equation (2) and the square of Equation (3).

As a result, the square of the amplitude E is expressed by $$E^2 = e_A^2 + e_B^2 \qquad (5)$$

where the theorem of $\sin^2 x + \cos^2 x = 1$ is used. Thus, the fine position is determined as $$\theta_E' = 1/K_E \cdot \sin^{-1}(e_A/\sqrt{e_A^2 + e_B^2}) \qquad (6)$$

$$\theta_E' = 1/K_E \cdot \cos^{-1}(e_B/\sqrt{e_A^2 + e_B^2}) \qquad (7)$$

From the fine position $\theta'_E$ and coarse position, it is possible to determine the position of the encoder.

The circuit arrangement for executing the above method is formed of a sampling pulse timer for generating the sampling time Ts, a waveform shaping circuit for detecting the coarse position (for example, the precision of ¼ the period of the encoder original signal), an up/down counter, a temporary storage circuit, a sample holder for detecting the fine position, a saw-tooth wave generating circuit, a modulating circuit, a time width counter and a microcomputer associated with the arithmetic control section for the arithmetic processing. The modulating circuit and the time width counter can be realized by an analog-to-digital converter.

The temporary storage circuit and sample holder are used for the simultaneous generation of the coarse position data and the A-phase signal voltage and B-phase signal voltage of the encoder original signal.

The speed can be determined by the amount of change of this position because the precise position data can be produced at each sampling time.

Now, an embodiment of a position/speed detection method and apparatus of this invention will be described with reference to FIGS. 1 to 5.

Figure 1:
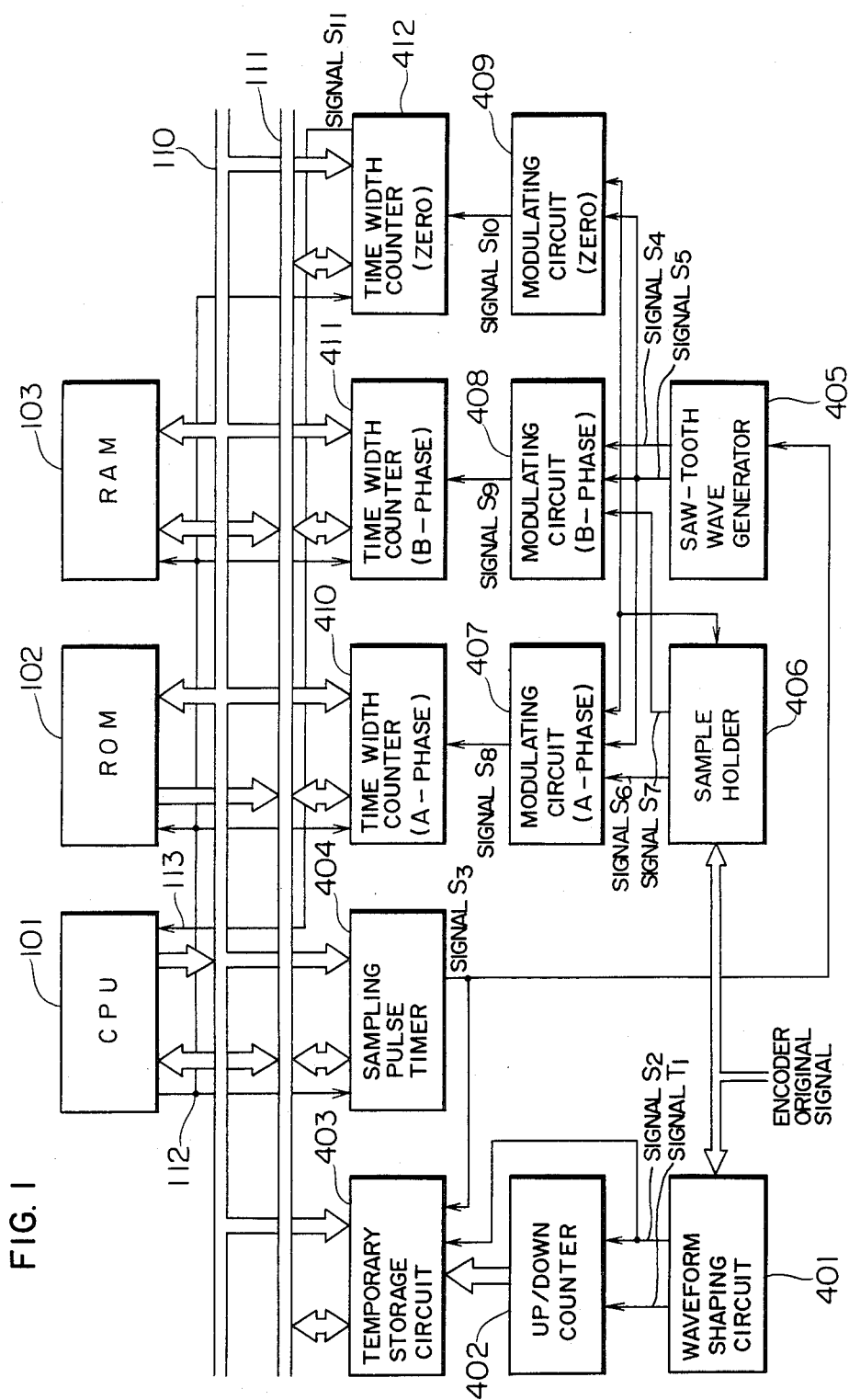
FIG. 1 is a block diagram of one embodiment of a position/speed detection apparatus of the invention.
Figure 2:
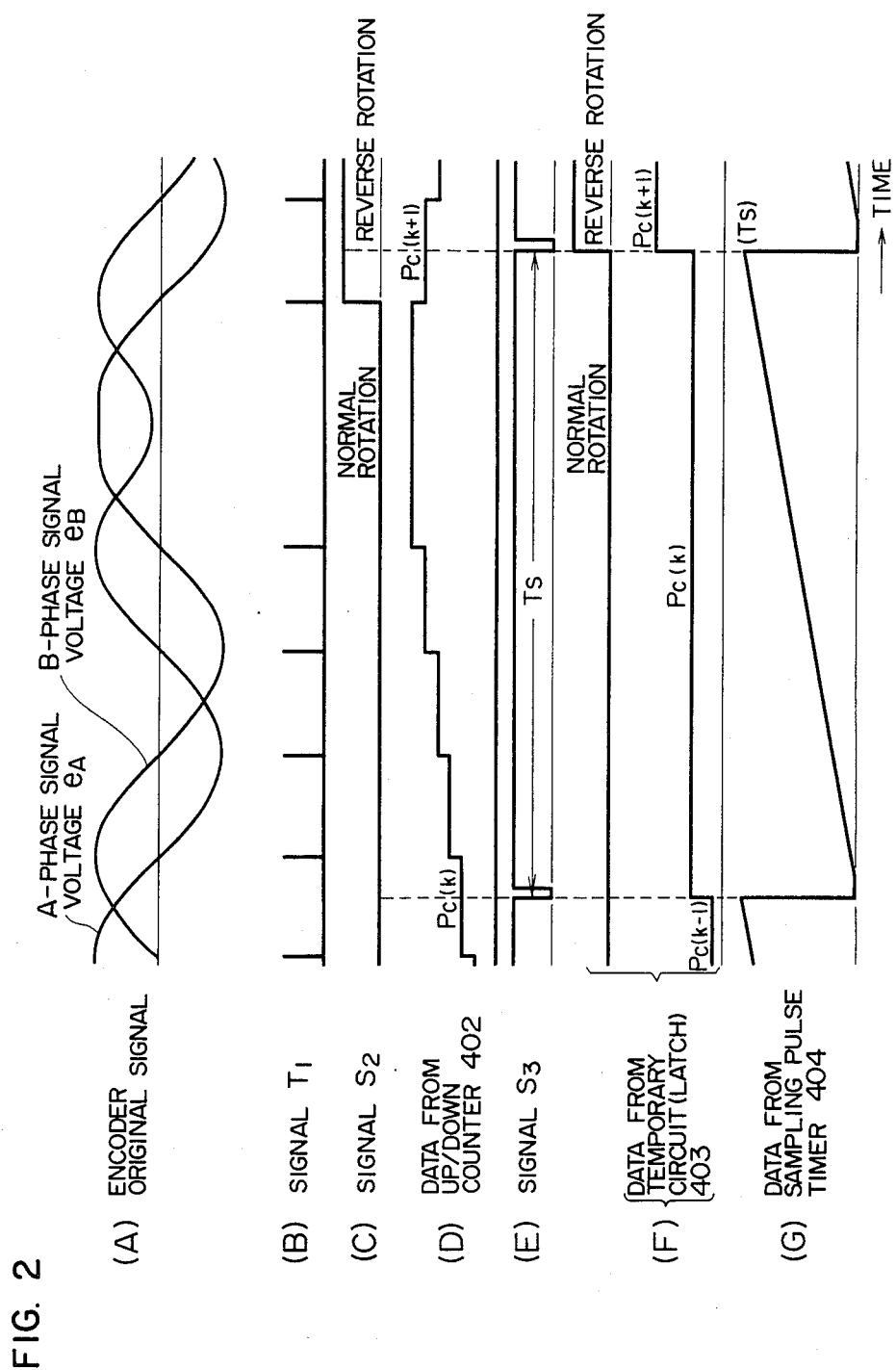
FIGS. 2A, 2B, 2C, 2D, 2E, 2F, 2G are a timing chart for the coarse position detection with four-fold precision as one embodiment of a position/speed detec method of the invention.
Figure 3:
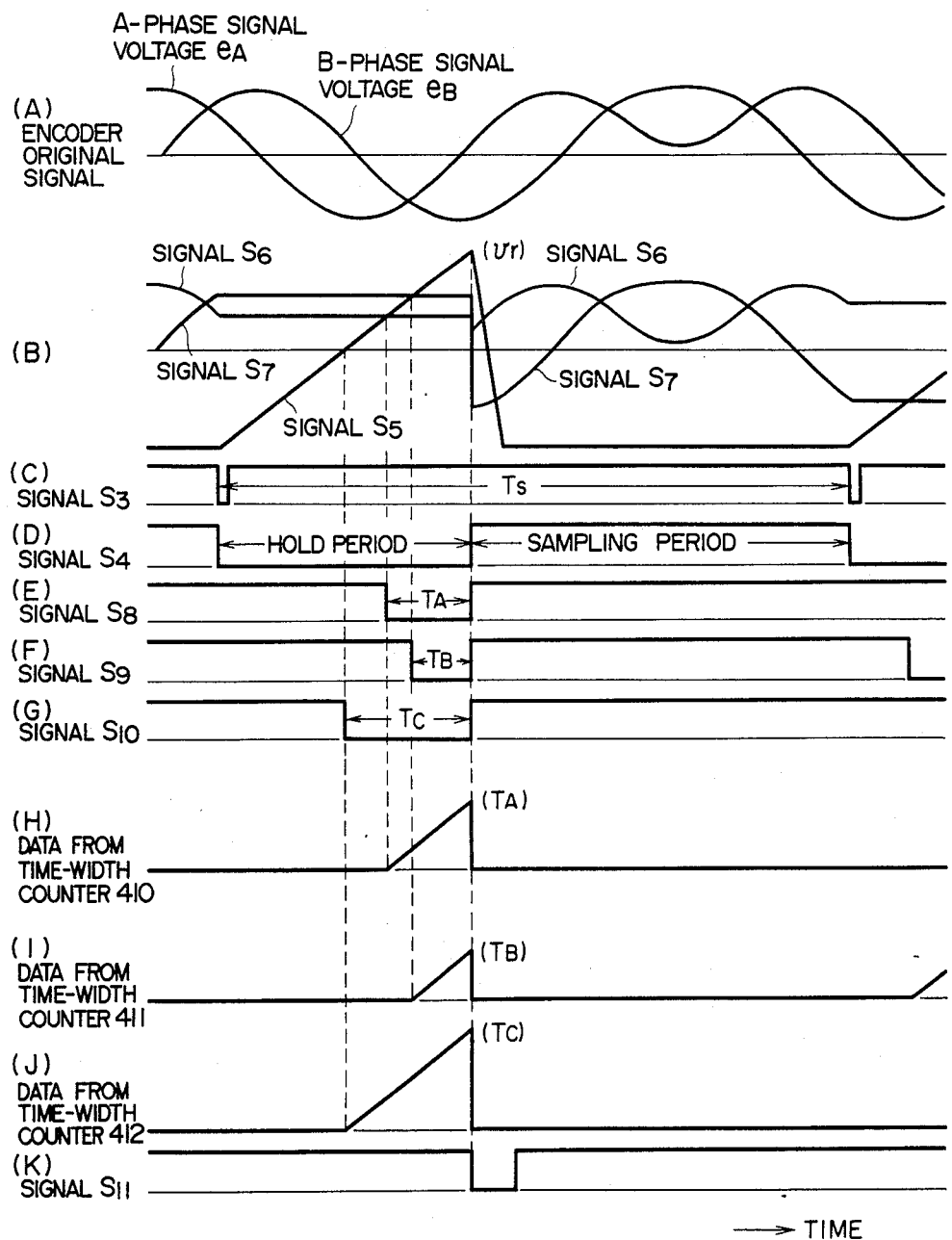
FIGS. 3A through 3K are a timing chart for the fine position detection with high precision.
Figure 4:
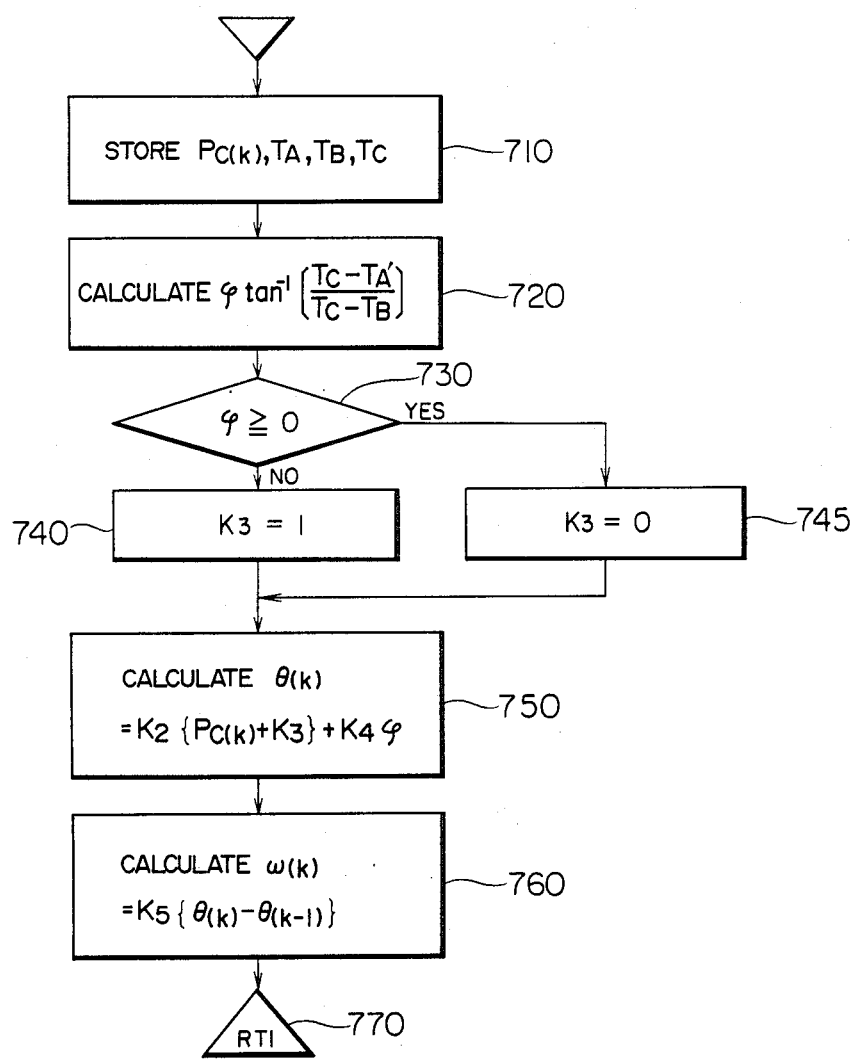
FIG. 4 is a flow chart for the detection of position and speed.

FIG. 1 is a block diagram of one embodiment of a position/speed detecting apparatus of the invention, FIG. 2 is a timing chart for four-fold precision detection of position in this embodiment, FIG. 3 is a timing chart for fine position detection in this embodiment, FIG. 4 is a flow chart for the detection of position and speed in this embodiment, and FIG. 5 is an explanatory diagram useful for explaining the principle of the position detection.

Figure 6:
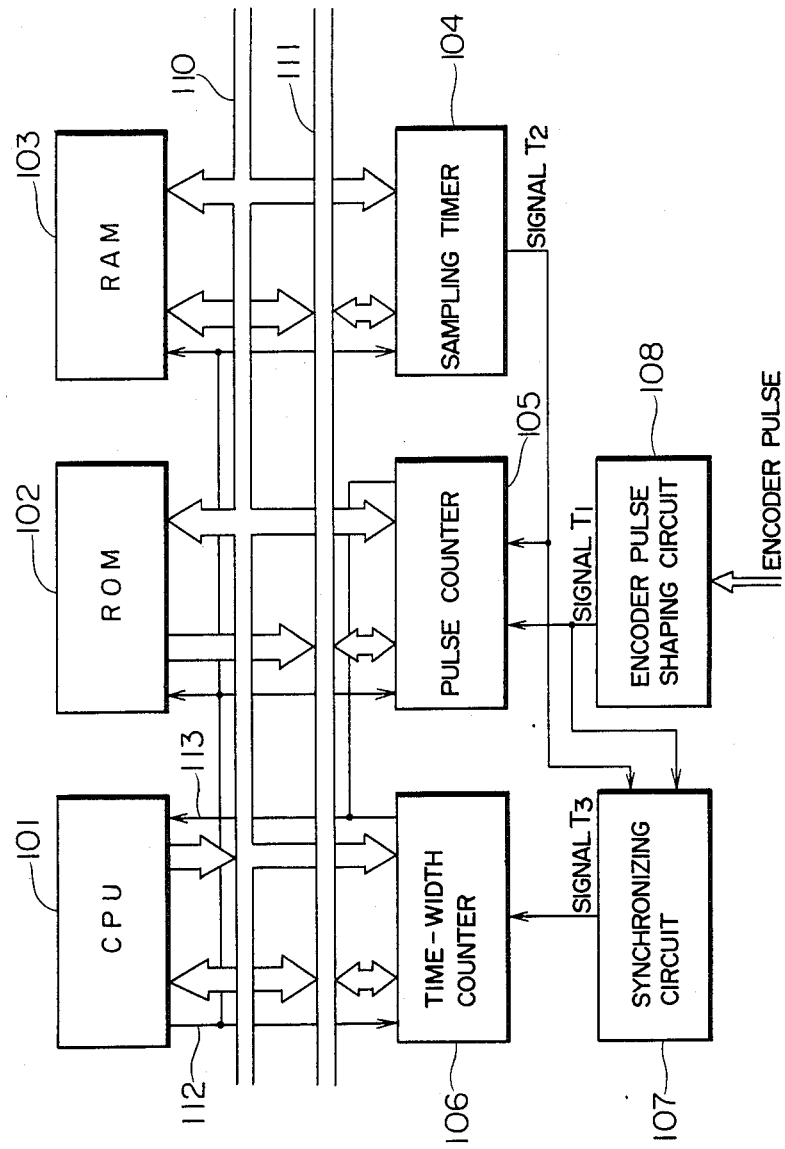
FIG. 6 is a block diagram of a conventional speed detection apparatus.

Like elements corresponding to those of FIGS. 6 to 8 are identified by the same reference numerals.

The circuit arrangement of the coarse position detecting section will be first described with reference to FIG. 1 and the timing chart of FIG. 2.

A waveform shaping circuit 401 generates a thin pulse signal (signal $T_1$ shown in FIG. 7B and FIG. 2B) at zero value of the encoder original signal and generates a signal $S_2$ (see FIG. 2C) for reversing the rotation of the motor as a moving body. The signal $T_1$ as illustrated has ¼ the period of the encoder original signal. Thus, the precision of coarse position Pc(k) is ¼ the period of the encoder original signal.

An up/down counter 402 counts down or up depending on the signal $S_2$. Thus, the instantaneous coarse position Pc (see FIG. 2D) is detected by this up/down counter 402.

A sampling pulse timer 404 generates a signal $S_3$ (FIG. 2E) as a sampling signal at each sampling time Ts.

A temporary storage circuit 403 receives the sampling signal $S_3$ from the sampling pulse timer 404 to synchronize the instantaneous coarse position Pc from the up/down counter 402 therewith, and stores it as the coarse position data Pc(k) (see FIG. 2F). This temporary storage circuit 403 also stores the rotation-reversing signal $S_2$ from the waveform shaping circuit 401 together with the coarse position Pc(k).

The circuit arrangement of the fine position detecting section will be described with reference to FIG. 1 and the timing chart of FIG. 3.

A saw-tooth wave generating circuit 405 is actuated by the sampling signal $S_3$ (see FIG. 3C) to generate a saw-tooth wave signal $S_5$ (FIG. 3B) as a carrier wave and a modulation permission signal $S_4$ (see FIG. 3D) indicative of the effective region of the sawtooth wave signal $S_5$. The signal $S_4$ is generated at the same time as the signal $S_5$ and is stopped when the signal $S_5$ reaches a reference voltage Vr.

A sample holder 406 holds the values of the A-phase signal voltage $e_A$ and B-phase signal voltage $e_B$ of the encoder original signal at the time of the sampling signal $S_3$ during the time in which the signal $S_4$ is produced from the saw-tooth wave generating circuit 405, and produces the A-phase signal voltage $e_A$ as an A-phase hold signal $S_6$ (see FIG. 3B) and the B-phase signal voltage $e_B$ as a B-phase hold signal $S_7$ (see FIG. 3B).

A modulating circuit 407 pulse-width modulates the A-phase hold signal $S_6$ (see FIG. 3B) on the modulation permission signal $S_4$ and saw-tooth wave signal $S_5$ supplied from the saw-tooth wave generating circuit 405 and produces the A-phase pulse-width modulated signal $S_8$ (see FIG. 3E).

Another modulating circuit 408 similar to the modulating circuit 407 pulse-width modulates the B-phase hold signal $S_7$ on the modulation permission signal $S_4$ and saw-tooth wave signal $S_5$ supplied from the saw-tooth wave generating circuit 405 and produces a B-phase pulse-width modulated signal $S_9$ (see FIG. 3F)

Still another modulating circuit 409 generates a reference value for correcting the effect of the change of the slope of the saw-tooth wave signal $S_5$ produced from the saw-tooth wave generating circuit 405 due to the change of the ambient temperature of the apparatus.

That is, this modulating circuit 409 modulates the zero voltage not depending on the ambient temperature on the modulation permission signal $S_4$ and saw-tooth wave signal $S_5$ produced from the saw-tooth wave generating circuit 405 and produces a zero value pulse-width modulated signal $S_{10}$ (see FIG. 3G)

A time width counter 410 counts the A-phase time width $T_A$ of the A-phase pulse-width modulated signal $S_8$ from the modulating circuit 407.

Another time width counter 411 counts the B-phase time width $T_B$ of the B-phase pulse width modulated signal $S_9$ from the modulating circuit 408.

Still another time width counter 412 counts the zero value time width Tc of the zero value pulse width modulated signal $S_{10}$ from the modulating circuit 409. This time width counter 412 also generates an interrupt signal $S_{11}$ (see FIG. 3K) and supplies it through an interrupt signal line 113 to the microcomputer CPU 101.

The transmission of data from or to the microcomputer will be described below.

The sampling pulse timer 404 is connected to the microcomputer through the address bus 110 and data bus 111 and thus it is controlled to set the sampling time Ts by the microcomputer.

The temporary storage circuit 403 and each of the time width counters 410, 411 and 412 are connected to the microcomputer through the address bus 110 and data bus 111, and thus supply their data (see FIGS. 3H, 3I and 3J) coarse position Pc(k), A-phase time width $T_A$, B-phase time width $T_B$ and zero value time width Tc) to the microcomputer.

The microcomputer calculates the position and speed from the received data as will be described with reference to the timing chart of FIG. 4.

The microcomputer is actuated by the interrupt signal $S_{11}$ from the time width counter 412, or the interrupt processing, to begin reception of data and calculation.

That is, at step 710 is FIG. 4 the microcomputer receives the coarse position Pc(k) from the temporary storage circuit 403, the A-phase time width $T_A$ from the time width counter 410, the B-phase time width $T_B$ from the time width counter 411 and the zero time width Tc from the time width counter 412.

At step 720, the fine position $\phi$ f Equation (4) is calculated.

At this time, first the ratio of the A-phase signal voltage $e_A$ of the encoder original signal to the B-phase signal voltage $e_B$ is obtained.

In other words, if the value of the saw-tooth wave generating circuit 405 reaches the reference voltage Vr at time zero, the value $e_5$ at a time t before time zero is given by $$e_s = Vr - a \cdot t \tag{8}$$

where a is the gradient of the saw-tooth wave signal $S_5$ during the period in which the modulation permission signal $S_4$ is produced.

The A-phase signal voltage $e_A$, B-phase signal voltage $e_B$ and zero value 0 can be determined by substituting their time width into Equation (8) as follows:

$$e_A = Vr - a \cdot T_A \tag{9}$$

$$e_B = Vr - a \cdot T_B \tag{10}$$

$$0 = Vr - a \cdot T_C \tag{11}$$

Substituting of the reference voltage Vr of Eq. (11) into Eqs. (9) and (10) will yield the following equations:

$$e_A = a(T_C - T_A) \quad (12)$$

$$e_B = a(T_C - T_B) \quad (13)$$

The calculation of Equations (12) and (13) are made by reference to a table of numbers incorporated within the microcomputer for reducing the time to be taken in the calculation.

At step 730, decision is made of whether the fine position $\phi$ is a positive or negative value. If it is negative, at step 740 the constant $K_3$ is set to 1, and if it is positive, at step 745 the constant $K_3$ is set to zero.

Then, at step 750, the position is detected by combining the coarse position Pc(k) and fine position $\phi$.

The position detection through these steps 730 to 750 will be described with reference to FIG. 5.

First, the nodes of the position on the encoder original signal are classified as in FIG. 5.

The ratio ($e_A/e_B$) of the A-phase signal voltage $e_A$ to B-phase signal voltage $e_B$, of encoder original signal is expressed by-tan-type function. The fine position $\phi$ to be determined is positive when the position is mode 2, and the origin is mode change point $M_{0-2}$.

When the position is mode 3, the fine position is negative, and the origin is mode change point $M_{3-1}$.

When the position is mode 1, the fine position is positive and the origin is mode change point $M_{3-1}$.

When the position is mode 0, the fine position is negative, and the origin is mode change point $M_{0-2}$.

Therefore, since the coarse position Pc(k) indicates the origin of the fine position $\phi$ when the position is mode 2 and mode 1, the coarse position Pc(k) and the fine position $\phi$ are converted to the actual encoder position and then added to each other.

Also, since the coarse position Pc(k) is coarse position 1 smaller than the origin of the fine position $\phi$ when the position is mode 3 and mode zero, the origin of the fine position $\phi$ which can be indicated by the sum of the coarse position Pc(k) and 1, or Pc(k)+1, and the fine position $\phi$ are converted to the actual encoder position and then added to each other.

The way to calculate the position $\theta(k)$ is thus dependent on the mode of position because it is associated with the positive and negative sign of the fine position $\phi$.

Thus, as in the flow chart of FIG. 4, a decision is made of whether the fine position $\phi$ is positive or negative, and the equation for the position $\theta(k)$ is changed in accordance with the result of the decision.

This equation is given as $$\theta(k) = K_2\{Pc(k) + K_3\} + K_4\phi \quad (16)$$

where $K_2$ and $K_4$ are constants dependent on the frequency of the encoder original signal per revolution of the encoder, and constant $K_3$ is zero when the fine position $\phi$ is positive (or when the position is mode 2 and mode 1) and 1 when the fine position $\phi$ is negative (,or when the position is mode 3 and mode 0).

At step 760 in FIG. 4, the change of the position $\theta(k)$ at each sampling time Ts is calculated and then the speed $\omega(k)$ is detected by calculating the following equation:

$$\omega(k) = K_5\{\theta(k) - \theta(k-1)\} \quad (17)$$

where $K_5$ is a constant depending on the sampling time Ts.

Then, at step 770 (RTI, or return from interrupt), the microcomputer returns to the main task by the interrupt process for detection of position and speed.

In this way, one cycle of the detection of position and speed is finished.

According to this embodiment of this invention, the position and speed can be determined with high precision irrespective of the motor speed, the amplitude fluctuation of the encoder original signal and the change of ambient temperature.

While in this embodiment the encoder original signal of two-phase periodic waves of different phases is cancelled out at step 720 in order to correct the amplitude fluctuation of the encoder original signal, the amplitude fluctuation may be corrected after suming the square of Eq. (2) and square of Eq. (3) and solving it for the amplitude E.

According to this invention, the speed in a wide range can be detected at each sampling time, and particularly the response in the low-speed control which was poor in the prior art can be improved.

Moreover, the still condition (,or zero speed) which could not be detected in the prior art can be detected, and the position can be detected with such a precision as ¼ the period of the encoder original signal or below.

Furthermore, the position and speed can be detected with high precision irrespective of the amplitude fluctuation of the encoder original signal and change of ambient temperature, and therefore the servo motor can be better controlled as to its position and speed.

We claim:

1. A position/speed detection apparatus for detecting the position and speed of a moving body by using an encoder, comprising:
    a coarse position detecting section including a waveform shaping circuit which is responsive to an encoder original signal to produce an encoder pulse, an up/down counter which counts the encoder pulse to detect a coarse position, and a temporary storage circuit for temporarily storing the detected coarse position from the up/down counter in order to synchronize the coarse position with a sampling signal generated from a sampling timer at each sampling time; and
    a fine-position detecting section including a sample holder for holding the encoder original signal for the sampling time, a saw-tooth wave generating circuit which is actuated by the sampling signal from the sampling pulse timer to generate a carrier wave on which the held encoder original signal is pulse-width modulated, a pulse-width modulating circuit, and a time-width counter for counting the pulse width of the pulse-width modulated carrier; the sampling pulse timer, the temporary storage circuit and the time-width counter being connected to an arithmetic control section.

2. A position/speed detection apparatus according to claim 3, wherein the arithmetic control section has means for correcting the amplitude fluctuation of the encoder original signal by using the two-phase periodical waves having different phases displaced by a constant value but the same shape, of the encoder original signal.

3. A position/speed detection method and apparatus according to claim 3, wherein the moving body is the roatry shaft of a motor.

4. A position/speed detection apparatus comprising:
encoder means for generating an A phase sinewave original signal and a B phase sinewave original signal having the same waveform as a predetermined difference in phase from said A phase sinewave original signal;
means for generating a zero value signal of said A and B sinewave original signals;
means for detecting a coarse position of said moving body using a unit of displacement of said moving body corresponding to a quarter period of A and B phase sinewave original signals;
means for correcting the instantaneous value of said A and B phase sinewave original signals by the instantaneous value of said zero value signal;
means for operating on said respective instantaneous value of said A and B phase sinewave original signals by using a trigonometric function so as to detect a fine position of said moving body; and
means for generating digital signals according to said fine position, whereby the displacement amount of said moving body is obtained for each of a plurality of predetermined time periods to move the speed of said moving body as a digital signal.

5. A position/speed detection apparatus according to claim 4, herein the moving body is the rotary shaft of a motor.

6. A posiiton/speed detection apparatus according to claim 4, wherein the variation of amplitude of the encoder original signal is corrected by said correcting means on the basis of $K \sin 0/K \cos 0 = \tan 0$, where K is a constant depending on the number of cycles of the encoder original signal per revolution of the encoder means and O is the angular position of the encoder means.

7. A position/speed detection apparatus according to claim 4, wherein the variation of amplitude of the encoder original signal is corrected by said correcting means on the basis of $K^2 \sin 0 + K^2 \cos 0 = K^2$, and K is a constant depending on the number of cycles of the encoder original signal per revolution of the encoder means and O is the angular position of the encoder means.

8. A position/speed detection apparatus for detecting the position and speed of a moving body by using an encoder, comprising:
a coarse position detecting section including a waveform shaping circuit which is responsive to an encoder original signal to produce an encoder pulse, an up/down counter which counts the encoder pulse to detect a coarse position, and a temporary storage circuit for temporarily stored the detected coarse position from the up/down counter in order to make the coarse positon be synchronized with a sampling signal generated from a sampling timer at each sampling time; and
a fine-position detecting section including a sample holder for holding the encoder original signal for the sampling time and an analog/digital converter for converting the value of the encoder original signal held by the sampling signal from said sampling timer and the value of the zero value signal which is an average of the encoder original signal to a digital value; the sampling pulse timer, the temporary storage circuit and the analog/digital converter being connected to an arithmetic control section.

9. A position/speed detection apparatus according to claim 8, wherein the arithmetic control section has means for correcting the amplitude fluctuation of the encoder original signal by using two-phase periodic waves having different phases displaced by a constant value but the same shape, of the encoder original signal.

* * * * *